United States Patent [19]

Franke et al.

[11] Patent Number: 5,001,229
[45] Date of Patent: Mar. 19, 1991

[54] WATER SOLUBLE BASIC DYESTUFFS

[75] Inventors: Günter Franke, Leichlingen; Peter Wild, Odenthal, both of Fed. Rep. of Germany

[73] Assignee: Bayer Aktiengesellschaft, Leverkusen, Fed. Rep. of Germany

[21] Appl. No.: 285,478

[22] Filed: Dec. 16, 1988

[30] Foreign Application Priority Data

Dec. 19, 1987 [DE] Fed. Rep. of Germany ....... 3743235

[51] Int. Cl.$^5$ ............... C09B 29/045; C09B 29/36; C09B 44/08; D21H 21/28
[52] U.S. Cl. ............... 534/775; 534/573; 534/588; 534/591; 534/598; 534/605; 534/606; 534/607; 534/887; 544/300
[58] Field of Search ............ 534/775, 606, 607, 605; 544/300

[56] References Cited

U.S. PATENT DOCUMENTS

| | | | |
|---|---|---|---|
| 3,862,116 | 1/1975 | Toji | 584/775 |
| 4,071,312 | 1/1978 | Blackwell | 534/775 X |
| 4,525,583 | 6/1986 | Adam | 534/775 X |

FOREIGN PATENT DOCUMENTS

| | | | |
|---|---|---|---|
| 2403736 | 8/1974 | Fed. Rep. of Germany | 534/775 |
| 3434922 | 4/1986 | Fed. Rep. of Germany | 534/775 |
| 3434923 | 4/1986 | Fed. Rep. of Germany | 534/775 |
| 61-236861 | 10/1986 | Japan | 534/775 |
| 77-13441 | 6/1978 | Netherlands | 534/775 |

Primary Examiner—Floyd D. Higel
Attorney, Agent, or Firm—Sprung, Horn, Kramer & Woods

[57] ABSTRACT

Basic dyestuffs of the formula

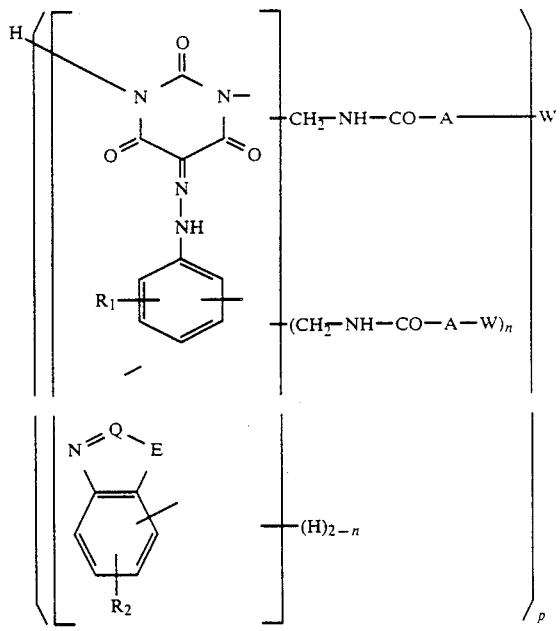

or tautomeric forms thereof,
wherein
$R_1$ and $R_2$ stand for hydrogen, $C_1$–$C_4$-alkyl, $C_1$–$C_4$-alkoxy or halogen,
Q - E stands for C-S, C-O, C-NH or $N^{\oplus}$-$N^{\ominus}$,
A stands for $C_1$–$C_4$-alkylene,
W stands for the radical of an aliphatic mono-, di-, tri-, tetra-, penta-, hexa- or heptamine, which can be protonated or quaternized,
n stands for 0 to 1.5 and
p stands for 1.3 to 10,
are suitable for dyeing materials which can be dyed with basic dyestuffs.

4 Claims, No Drawings

WATER SOLUBLE BASIC DYESTUFFS

The invention relates to basic dyestuffs of the formula

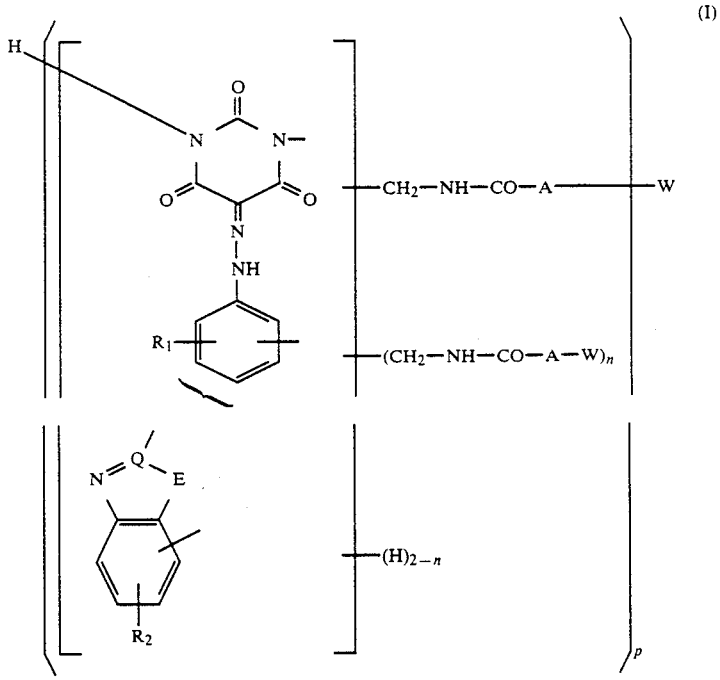

or tautomeric forms thereof, $R_1$ and $R_2$ stand for hydrogen, $C_1$-$C_4$-alkyl, $C_1$-$C_4$-alkoxy or halogen, Q - E stands for C-S, C-O, C-NH or $N^{\oplus}$-$N^{\ominus}$, A stands for $C_1$-$C_4$-alkylene, W stands for the radical of an aliphatic mono-, di-, tri-, tetra-, penta-, hexa- or heptamine, which can be protonated or quaternized, n stands for 0 to 1.5 and p stands for 1.3 to 10, their preparation and their use for dyeing materials which can be dyed with basic dyestuffs.

Halogen preferably stands for chlorine or bromine.

W preferably stands for the radical

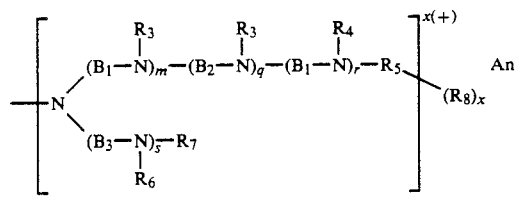

wherein m denotes 0, 1, 2 or 3, q and r denote 0 or 1, s denotes 0, 1 or 2, x denotes 0, 1, 2 or 3, $B_1$ and $B_2$ denote $C_2$- or $C_3$-alkylene, $B_3$ denotes $C_2$-$C_6$-alkylene or $C_4$-$C_{10}$-alkylene, which is interrupted by 1 to 3 oxygens, and $R_3$ to $R_7$ denote hydrogen, $C_1$-$C_4$-alkyl or $C_2$-$C_4$-alkyl which is substituted by OH or $C_1$-$C_4$-alkoxy, or $R_4$ and $R_5$ or - if $m+q+r+s=0$ - $R_5$ and $R_7$ are closed to form a 5- or 6-membered ring, $R_8$ denotes methyl, ethyl, hydroxyethyl or hydroxypropyl and An denotes the equivalents of an anion which compensate the charge x (+). Preferred 5- or 6-membered rings are

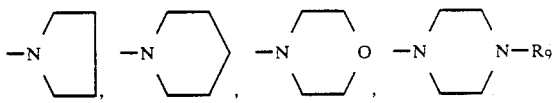

wherein $R_9$ is hydrogen, $C_1$-$C_4$-alkyl or $C_2$-$C_4$-alkyl which is substituted by OH, $NH_2$ or $C_1$-$C_4$-alkoxy.

Possible anions An are all the organic and inorganic anions customary for cationic dyestuffs. Colourless anions are preferred.

The anion is in general determined by the preparation process and the purification possibly carried out on the starting substances. However, the anions can also be exchanged for other anions in a known manner. Examples of An which may be mentioned are: halides, such as chloride, bromide and iodide; and sulphate, bisulphate, methylsulphate, ethylsulphate, amidosulphate, perchlorate, phosphate, hydroxide, formate, acetate, propionate, oxalate, malonate, succinate, maleate, chloroacetate, trichloroacetate, hydroxyacetate, methoxyacetate, ethoxyacetate, lactate, citrate, benzoate, methanesulphonate, ethanesulphonate, benzenesulphonate, p-toluenesulphonate, carbonate, tetrachlorozincate and tetrafluoroborate.

Preferred dyestuffs of the formula (I) are those of the formula

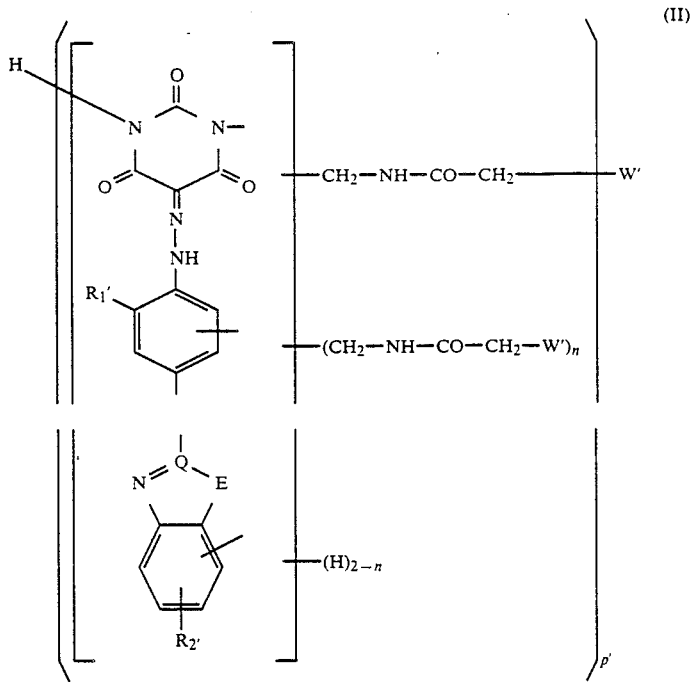
(II)

or tautomeric forms thereof,
wherein
$R_1'$ stands for hydrogen, methoxy, ethoxy or chlorine,
$R_2'$ stands for hydrogen, methyl, ethyl, methoxy or ethoxy,
$p'$ stands for 1.5 to 6 and
$W''$ stands for 1. 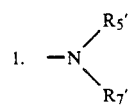

wherein
$R_5'$ is methyl, ethyl, n-propyl or —CH$_2$—CH$_2$—OH and
$R_7'$ is hydrogen, methyl, ethyl, n-propyl or —CH$_2$—CH$_2$—OH, 2. 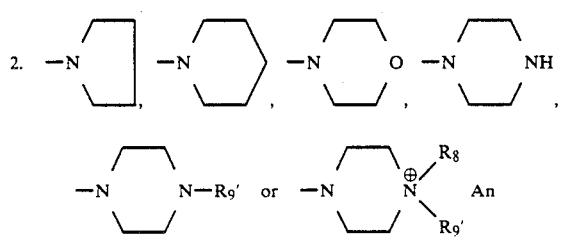

wherein
$R_9'$ is methyl, ethyl, —CH$_2$—CH$_2$—OH or —CH$_2$—CH$_2$—NH$_2$,
3. —NH-B$_3'$—NH$_2$
wherein
B$_3'$ is ethylene, propylene, trimethylene, hexamethylene or —(CH$_2$)$_3$—O—CH$_2$—CH$_2$—O—(CH$_2$)$_3$—, 4. 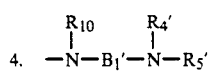

wherein
B$_1'$ is ethylene or trimethylene,
R$_4'$ is hydrogen, methyl, ethyl, n-propyl or —CH$_2$—CH$_2$—OH or
NR$_4'$R$_5'$ stands for one of the following rings:

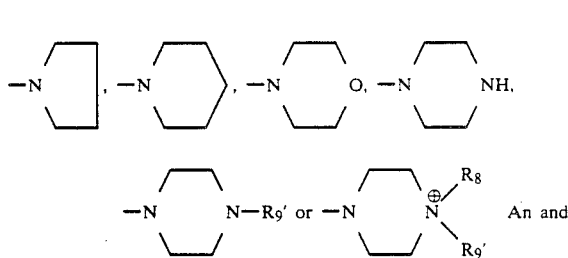

R$_{10}$ is hydrogen, methyl or ethyl,

5. 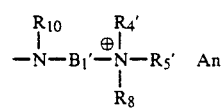

6. 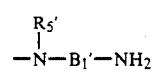

7. 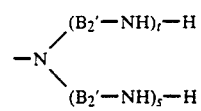

wherein
t=1, 2, 3, 4 or 5,
s+t=2, 3, 4 or 5 and $B_2'$ = ethylene, propylene or trimethylene,

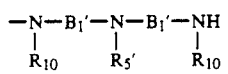

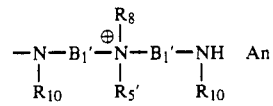 An

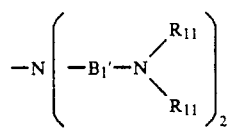

wherein
$R_{11}$ — methyl or ethyl,

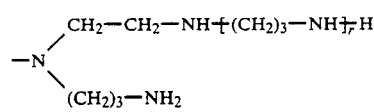

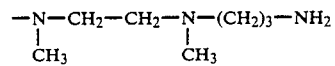

or

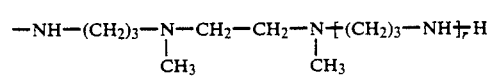

and
Q-E and n have the meaning given under formula (I).
Particularly preferred dyestuffs are basic dyestuffs of the formula

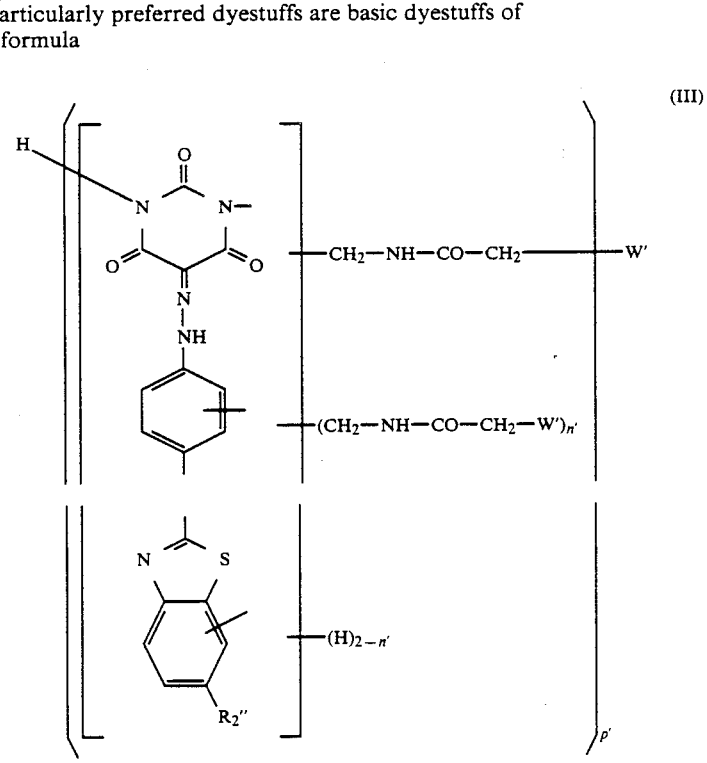

or tautomeric forms thereof,
wherein $R_2''$ stands for hydrogen or methyl,
$n'$ stands for 0.2 to 1.2 and
W' and p' have the meaning given under formula (II).
Dyestuffs of the formula (III) which may be singled out are those of the formula

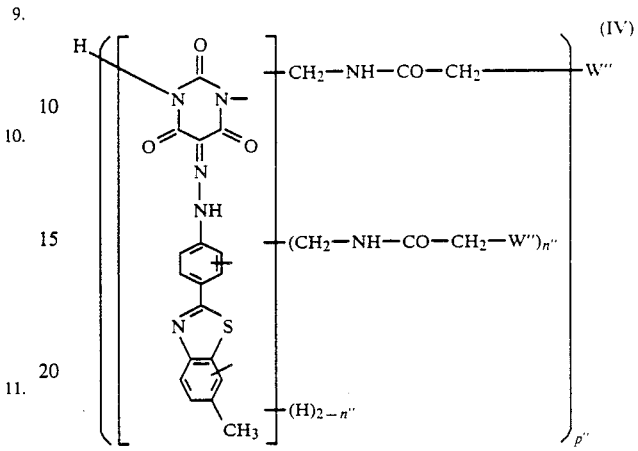

or tautomeric forms thereof,
wherein
W''' stands for the following radicals $-NH-(CH_2)_3-NH-CH_3$, $-NH-(CH_2)_3-NH-C_2H_5$,
$-NH-(CH_2)_3-N(CH_3)_2$, $-NH-(CH_2)_3-N(C_2H_5)_2$,

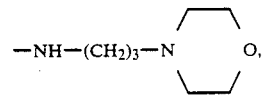

-continued

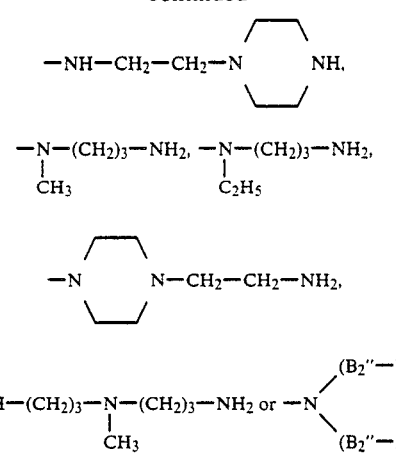

wherein
B$_2''$ is ethylene or propylene,
t' is 2, 3 or 4 and
s+t' is 3 or 4 and
n'' stands for 0.4 to 0.9 and
p'' stands for 2 to 5.

The invention also relates to a process for the preparation of dyestuffs of the formula (I), which is characterized in that a compound of the formula

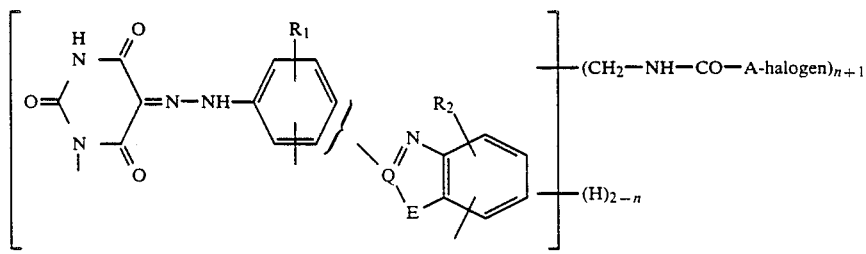

is reacted with an amine of the formula

HW                                     (VI)

or with mixtures of amines of this formula, in an aqueous-alkaline medium. The symbols used in the formulae (V) and (VI) here have the meaning given under formula (I).

A preferred process for the preparation of dyestuffs of the formula (III) is characterized in that a compound of the formula

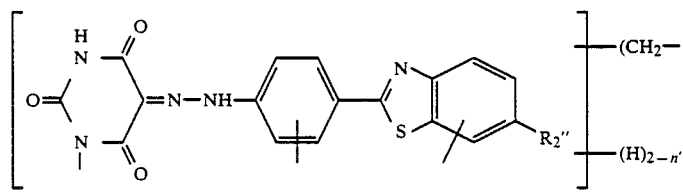

is reacted with an amine of the formula

HW'                                   (VIII)

or with mixtures of amines of this formula, in water at pH 9–12, preferably pH 10.0 to 11.5, and a temperature of 20°–100° C., preferably 35°–70° C. The symbols W' and R$_2''$ and n' here have the meanings given under the formulae (II) and (III).

The pH is maintained by addition of an alkaline agent, in particular an alkali metal hydroxide, such as sodium hydroxide or potassium hydroxide.

In the process according to the invention, the dyestuffs are isolated by lowering the pH to 5–9, preferably to 6–8, when the reaction has ended and before the mixture is filtered with suction. The solids can be dried or can be processed in the form of their moist presscakes to give liquid formulations.

The invention furthermore relates to a process for the preparation of compounds of the formula (V) by reaction of a chromophore of the formula

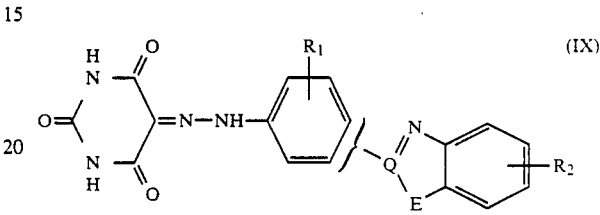

with paraformaldehyde and an amide of the formula

H$_2$N-CO-alkylene-halogen           (X)

in high-strength sulphuric or phosphoric acid or in

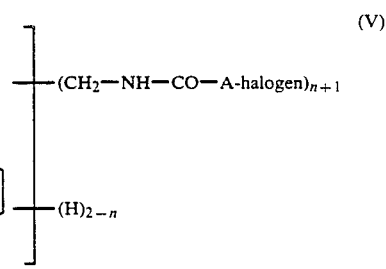

polyphosphoric acid, if appropriate with the addition of dehydrating agents, such as sulphur trioxide (oleum), phosphorus pentoxide, acetic anhydride or benzene- or toluenesulphonic acid, at 0° to 140° C.

A preferred process is that in which paraformaldehyde and an amide of the formula (X) are first reacted in 96 to 100% strength sulphuric acid or up to 10% strength oleum at 0° to 60° C., a chromophore of the formula (IX) is then added and the subsequent reaction is carried out at 0° to 140° C.

A preferred process for the preparation of com-

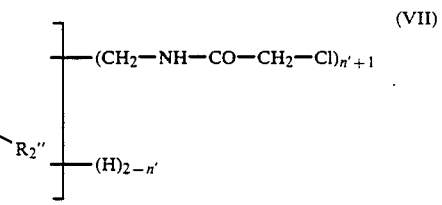

pounds of the formula (VII) is that in which paraformaldehyde and 2-chloroacetamide are first reacted in 98 to 100% strength sulphuric acid or up to 3% strength oleum at 15°–40° C., a chromophore of the formula

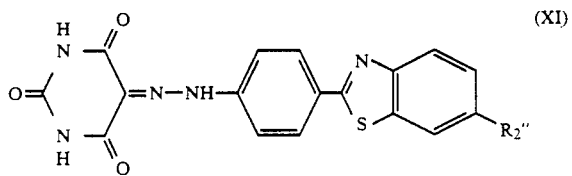

wherein
R$_2''$ stands for hydrogen or methyl as mentioned above, is then introduced into the solution formed and the subsequent reaction is carried out at 0° to 80° C. It is advantageous here initially to start at 0° to 5° C. and only later to increase the temperature.

In comparison with the conventional process for the preparation of precursors of the formula (V), in which a chromophore of the formula (IX) is reacted with an N-methylolamide of the formula

HO-CH$_2$-NH-CO-alkylene-halogen        (XII)

the process according to the invention has the advantage that in it the formation of the N-methylolamide of the formula (XII) and its reaction with the chromophore of the formula (IX) can be carried out in one stage. Surprisingly, no troublesome side reactions which impair the quality of the product in comparison with the conventional process occur in this one-pot reaction according to the invention.

The dyestuffs obtained by the routes described can be used as readily water-soluble dyestuffs from aqueous-acid solution for dyeing the most diverse materials, such as cellulose materials, polyacrylonitrile, acid-modified polyamide and polyester, wool and leather.

The dyestuffs according to the invention are above all outstandingly suitable for dyeing the most diverse types of paper in clear yellow shades.

During dyeing, high degrees of exhaustion are achieved, which can be recognized by the low pollution of the effluent with dyestuff. The dyeings have good to very good light- and wet-fastness properties. They are very stable towards the action of water, alcohols, soaps or aqueous organic acids.

EXAMPLE 1

19.8 g of paraformaldehyde and then 61.5 g of chloroacetamide are introduced into 350 ml of monohydrate (=100% strength sulphuric acid) at room temperature, with cooling. After the mixture has been subsequently stirred for 2 hours, it is cooled to 0° C. 100 g of the compound

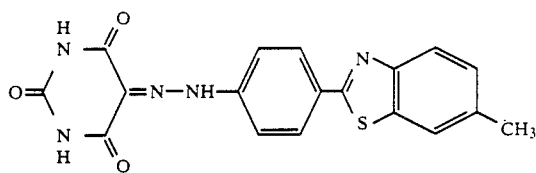

are introduced at 0°–5° C., with cooling. The mixture is stirred at 0°–5° C. for a further 2 hours and is allowed to come to room temperature, and stirring is continued overnight. The mixture is then heated and stirred at 60° C. for 4 hours. After cooling, the mixture is extracted by stirring on ice and the product is filtered off with suction and washed neutral with water. 560 g of a moist filter cake are obtained, corresponding to 151 g of dry product of the formula

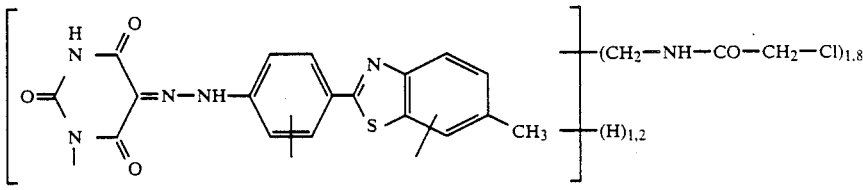

Elemental analysis of a sample dried at 60° showed 11.1% of chlorine.
$\lambda_{max}$ (dimethylformamide) 412 nm.

The same result is achieved if first chloroacetamide and then paraformaldehyde or a mixture of the two substances are introduced into sulphuric acid.

EXAMPLE 2

If the procedure is as in Example 1 but 15 g of paraformaldehyde and 47 g of chloroacetamide are used, 620 g of moist goods corresponding to 150 g of dry product of the formula

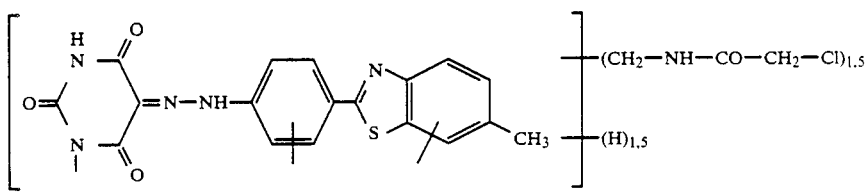

are obtained.
Elemental analysis: 9.9% of chlorine and 6.1% of sulphur $\lambda_{max}$ (dimethylformamide) 412 nm

EXAMPLE 3

If the procedure is as in Example 1 but 12 g of paraformaldehyde and 37 g of chloroacetamide are used, 706 g of moist goods corresponding to 131 g of dry product of the formula

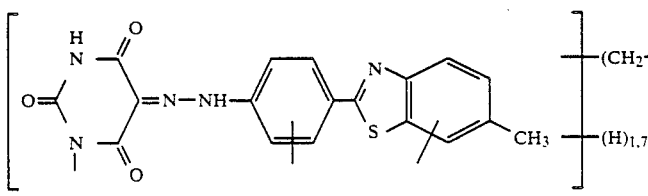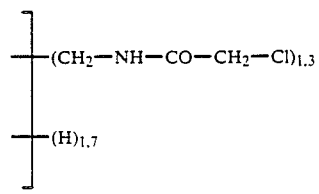

are obtained.

Elemental analysis: 8.8% of chlorine and 6.3% of sulphur λ$_{max}$ (dimethylformamide) 411 nm

EXAMPLE 4

The product of the above example is also obtained if 100 g of the compound

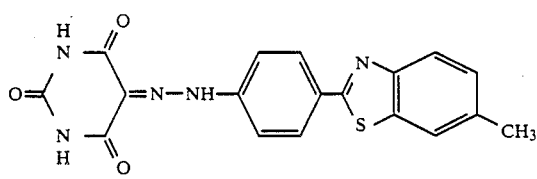

and 45 g of N-methylolchloroacetamide are introduced as a mixture into 500 ml of 2% strength oleum at 0°–5° C. and the mixture is subsequently stirred at this temperature for 2 hours. After stirring overnight at room temperature, the solution is heated briefly to 120° C., cooled and worked up as in Example 1.

EXAMPLE 5

If the procedure is as in Example 4 but only 40 g of N-methylolchloroacetamide are used, 120 g of the compound

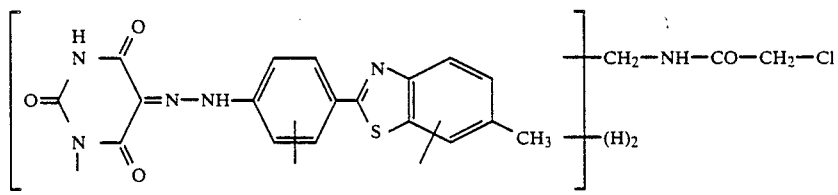

elemental analysis of which shows 7.3% of chlorine and 6.7% of sulphur, are obtained.

λ$_{max}$ (dimethylformamide) 410 nm

EXAMPLE 6

The same product as in Example 5 is obtained if the procedure according to Example 1 is followed but only 10 g of paraformaldehyde and 31 g of chloroacetamide are used.

EXAMPLE 7

371 g of the moist filter cake from Example 1 are introduced into 2.7 l of water. 37 g of 3-amino-1-methylaminopropane are added and the mixture is heated up to 45° C., the pH being kept at 11 by addition of 1N NaOH. The mixture is stirred at 45° C. until the pH is constant. After a further 3 hours, the pH is brought to 6.5 with dilute hydrochloric acid and the mixture is heated to 80° C., stirred until cold and filtered with suction. The product is washed with demineralized water until free from chloride to give 242 g of moist goods. After drying at 60°, 94 g of a compound of the formula

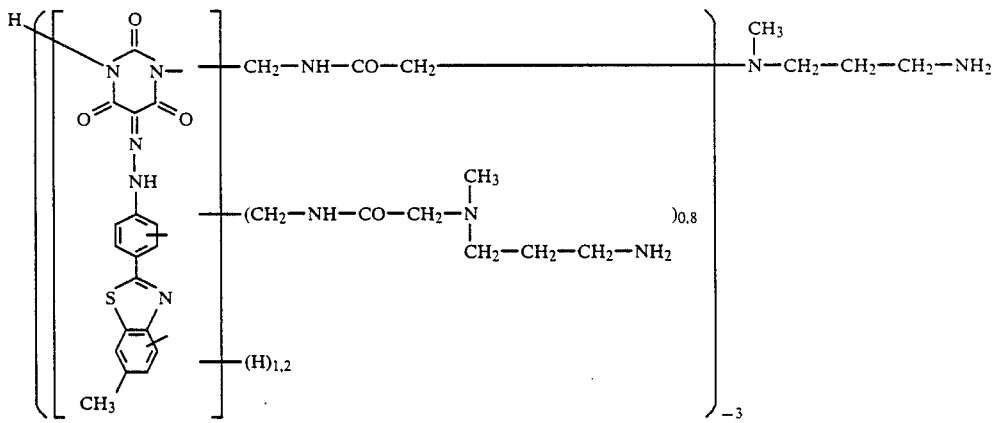

are obtained therefrom.

The linkage isomer (amine-chromophore bond via the primary amino group) and bridged products (linkage of two chromophores via an amine) occur as secondary components. The compound dyes paper a somewhat reddish-tinged yellow, λ$_{max}$ (20% strength acetic acid) 410 nm.

EXAMPLE 8

471 g of the moist filter cake from Example 2 are introduced into 3.1 l of water. 39 g of 3-amino-1-methylaminopropane are added and the mixture is heated to 40° C., the pH thereby being kept at 10.5. After 1 hour, the pH is brought to 11 and the mixture is kept at 40° until the pH remains constant. If the procedure is now as described in Example 7, drying gives 115 g of a product in which the compound of the formula

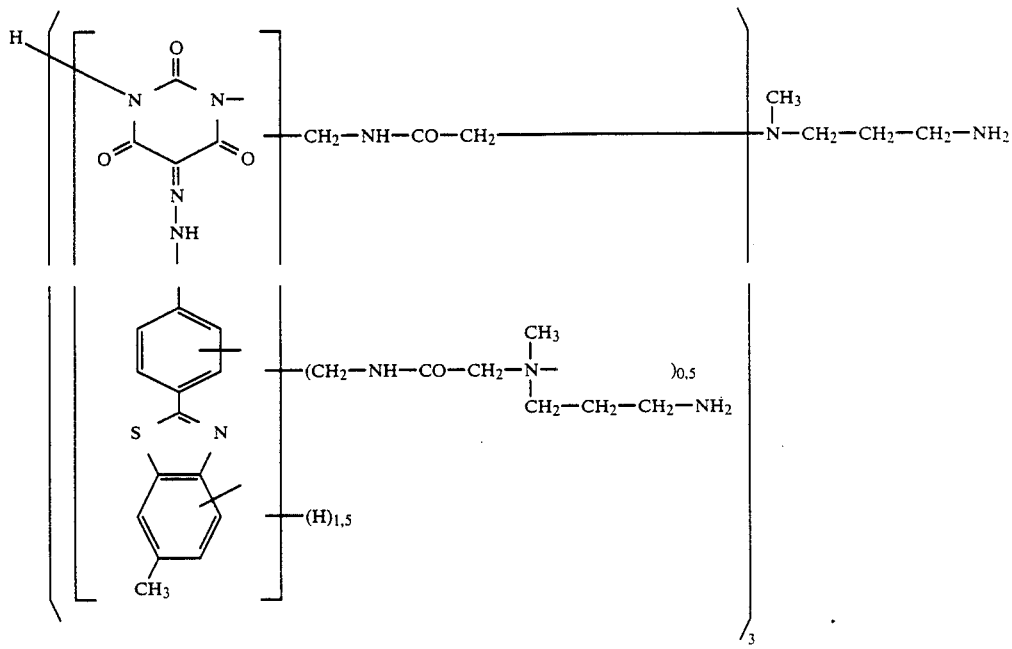

is the main component. This product dyes paper a somewhat reddish-tinged yellow.

EXAMPLE 9

296 g of the moist filter cake from Example 3 are introduced into 1.9 l of water at room temperature. 14.5 g of 3-amino-1-methylaminopropane are added and the mixture is heated up to 60° C., the pH being kept at 10.5 by addition of 1N NaOH. When the pH no longer changes, after about 4 hours, the pH is brought to 7 with half-concentrated hydrochloric acid and the mixture is heated to 80° C. and kept at this temperature for 1 hour. The product is filtered off hot with suction, washed free from chloride and dried at 60° C. 54 g of the dyestuff with a main component of the formula

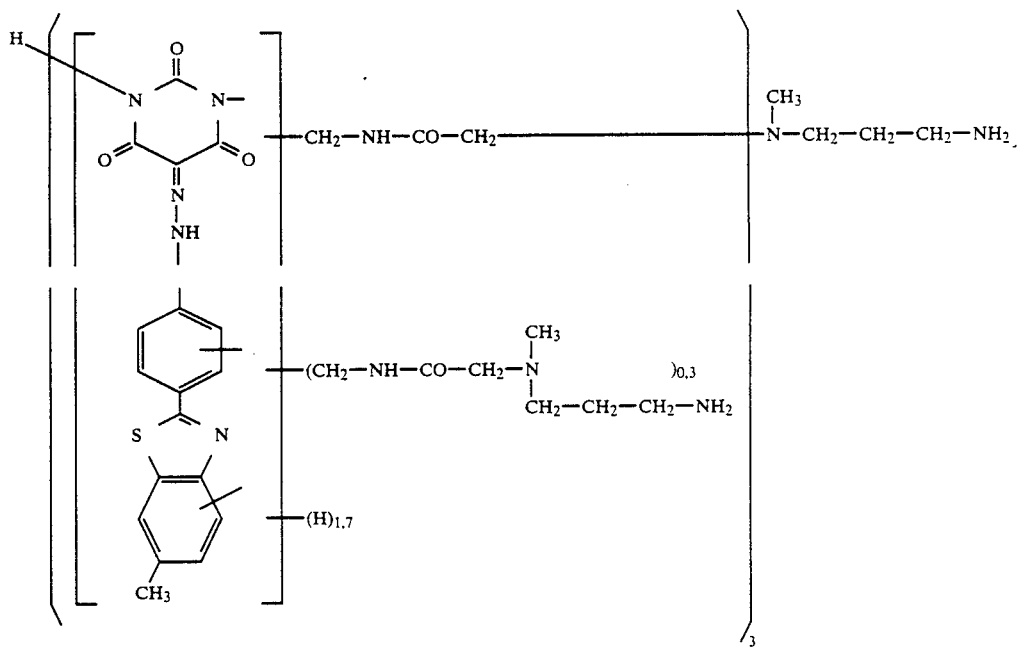

are obtained.

$\lambda_{max}$ (20% strength acetic acid) 408 nm.

EXAMPLE 10

296 g of the moist filter cake from Example 3 are introduced into 1.9 l of water at room temperature. 44 g of 3-amino-1-dimethylaminopropane are added and the subsequent procedure is as in Example 9. Drying gives 51 g of the dyestuff of the formula

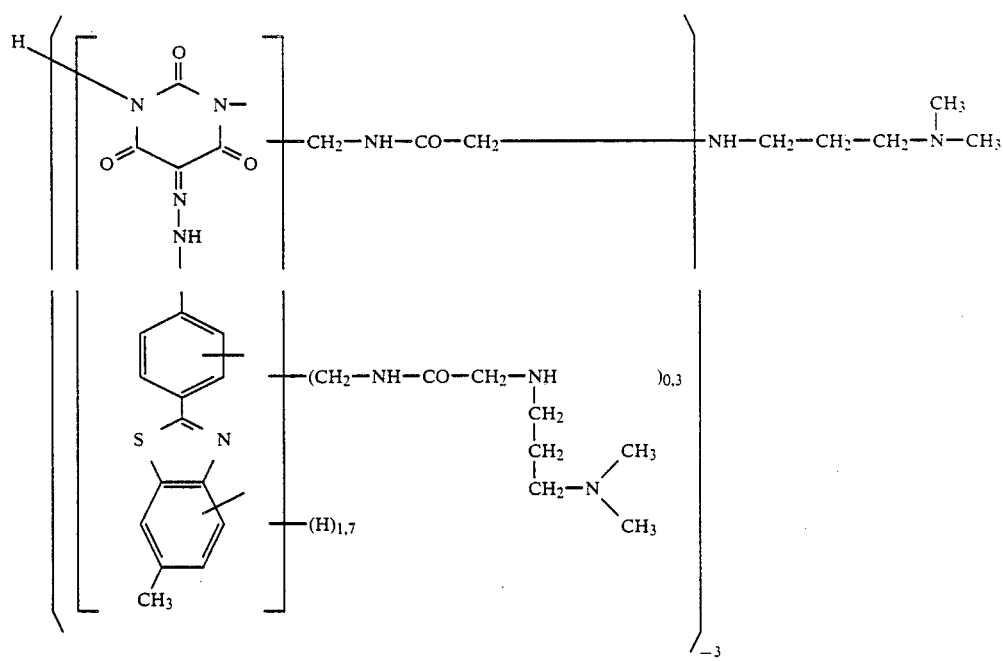

$\lambda_{max}$ (20% strength acetic acid) 409 nm.

EXAMPLE 11

If the procedure is as in Example 10 but only 16.5 g of 3-amino-1-dimethylaminopropane are used, 51 g of the dyestuff of the formula are obtained.

$\lambda_{max}$ (20% strength acetic acid) 404 nm.

EXAMPLE 12

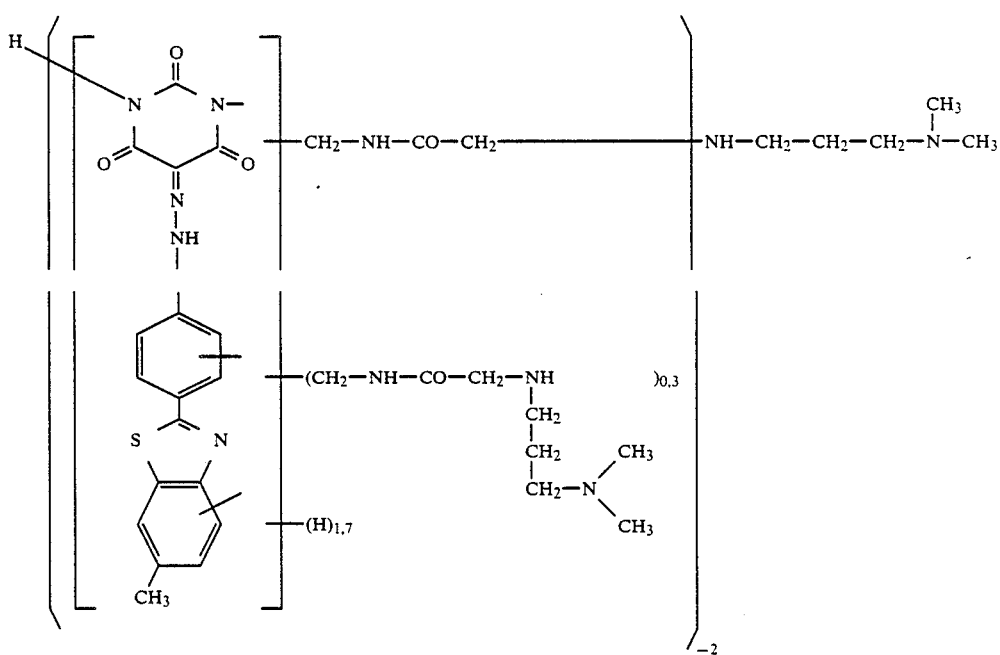

30 g of the compound from Example 5 or 6 are dissolved in 50 ml of 3-amino-1-dimethylaminopropane at room temperature. The solution is concentrated in vacuo at 50°-60° and the yellow oil which remains is converted into a powder by digestion with acetone. This powder is filtered off with suction and rinsed with acetone. Drying at 60° gives 34 g of the dyestuff of the formula

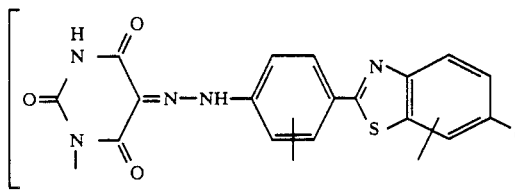

λ$_{max}$ (20% strength acetic acid) 412 nm.

In the following examples, the precursor from Example 1 is reacted in accordance with Example 7 with the amounts shown in Table 1 of the amines listed therein instead of with 37 g of 3-amino-1-methylaminopropane. The products thus obtained contain as the main component dyestuffs of the general formula

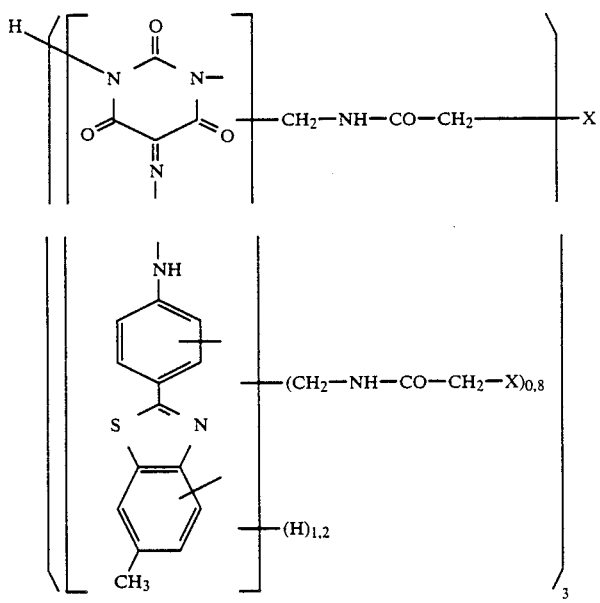

wherein
X stands for a monovalent radical of the amines listed.

The dyestuffs dye paper a somewhat reddish-tinged yellow. Mixtures of the amines mentioned in the examples can also be used in order to obtain dyestuffs of the above formula.

TABLE 1

| Examples | Amine | g used | g yield |
|---|---|---|---|
| 13 | H$_2$N—(CH$_2$—CH$_2$—(NH)$_3$H | 60 | 92 |
| 14 | H$_2$N—(CH$_2$—CH$_2$—NH)$_4$H | 77 | 90 |
| 15 | tripropylenetetramine | 79 | 93 |
| 16 | H$_2$N—(CH$_2$)$_3$—NH—C$_2$H$_5$ | 43 | 95 |
| 17 | H$_2$N—CH$_2$—CH$_2$—N(C$_2$H$_5$)$_2$ | 49 | 95 |
| 18 | H$_2$N—CH$_2$—CH$_2$—N(piperazine)NH | 54 | 94 |
| 19 | H$_2$N—(CH$_2$)$_3$—N(CH$_3$)$_2$ | 43 | 93 |

TABLE 1-continued

| Examples | Amine | g used | g yield |
|---|---|---|---|
| 20 | H$_2$N—(CH$_2$)$_3$—N(C$_2$H$_5$)$_2$ | 54 | 94 |
| 21 | (H$_2$N—CH$_2$—CH$_2$—CH$_2$)$_2$N—CH$_3$ | 59 | 91 |
| 22 | H$_2$N—CH$_2$—CH$_2$—CH$_2$—N(morpholine)O | 61 | 96 |
| 23 | H$_2$N—(CH$_2$)$_3$—NCH$_3$—CH$_2$—CH$_2$—OH | 55 | 95 |
| 24 | H$_2$N—(CH$_2$)$_3$—N(CH$_2$—CH$_2$—OH)$_2$ | 67 | 95 |
| 25 | H$_2$N(CH$_2$)$_3$—NH—CH$_2$—CH$_2$—OH | 50 | 91 |
| 26 | (H$_2$N—CH$_2$—CH$_2$—CH$_2$)$_2$NH | 55 | 93 |
| 27 | H$_2$N—CH$_2$—CHCH$_3$—NH$_2$ | 31 | 96 |
| 28 | HN(piperidine) | 36 | 94 |
| 29 | (CH$_3$—NH—CH$_2$—CH$_2$)$_2$N—CH$_3$ | 61 | 95 |
| 30 | H$_2$N—CH$_2$—CH$_2$—NH$_2$ | 25 | 91 |

In the following examples, the precursor from Example 2 is reacted in accordance with Example 8 with the amounts shown in Table 2 of the amines listed therein instead of with 39 g of 3-amino-1-methylaminopropane. The products thus obtained contain as the main component dyestuffs of the general formula

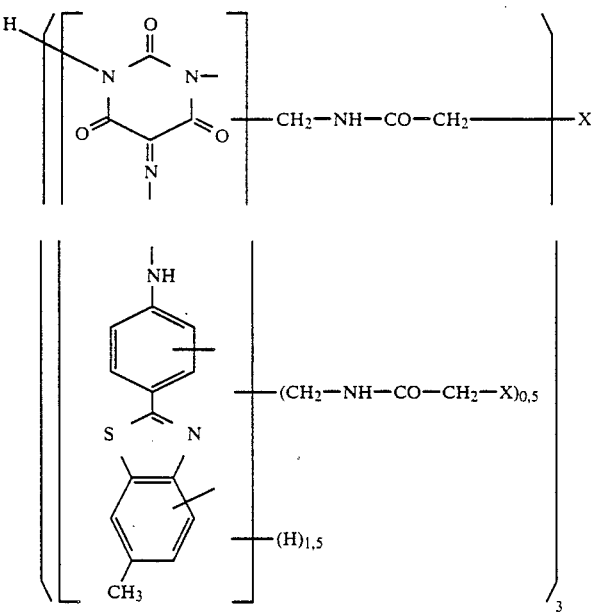

wherein

X stands for a monovalent radical of the amines listed.

The dyestuffs dye paper a somewhat reddish-tinged yellow. Mixtures of the amines mentioned in the examples can also be used in order to obtain dyestuffs of the above formula.

TABLE 2

| Examples | Amine | g used | g yield |
|---|---|---|---|
| 31 | $H_2N-CH_2-CH_2-N(C_2H_5)_2$ | 51 | 116 |
| 32 | $H_2N-(CH_2-CH_2-NH)_2-H$ | 45 | 116 |
| 33 | $H_2N-(CH_2-CH_2-NH)_3-H$ | 62 | 117 |
| 34 | $H_2N-(CH_2-CH_2-NH)_4-H$ | 78 | 111 |
| 35 | dipropylenetriamine | 56 | 114 |
| 36 | tripropylenetriamine | 80 | 110 |
| 37 | $H_2N-(CH_2)_3-N(CH_3)_2$ | 45 | 114 |
| 38 | $[(CH_3)_2N-CH_2-CH_2-CH_2]_2NH$ | 80 | 113 |
| 39 | $(H_2N-CH_2-CH_2-CH_2)_2-N-CH_3$ | 61 | 115 |
| 40 | $H_2N-(CH_2)_6-NH_2$ | 51 | 109 |
| 41 | $H_2N-CH_2-CH_2-N\diagup\diagdown NH$ (piperazine) | 57 | 110 |
| 42 | $H_2N-(CH_2)_3-NH-C_2H_5$ | 45 | 116 |

TABLE 2-continued

| Examples | Amine | g used | g yield |
|---|---|---|---|
| 43 | $H_2N-(CH_2)_3-N\diagup\diagdown O$ (morpholine) | 63 | 117 |
| 44 | $HN(CH_3)_2$ | 20 | 109 |
| 45 | $HN\diagup\diagdown O$ (morpholine) | 38 | 111 |
| 46 | $HN\diagup\diagdown$ (piperidine) | 31 | 109 |
| 47 | $H_2N-CH_2-CH_2-NH_2$ | 27 | 112 |

In the following examples, the precursor from Example 3 is reacted in accordance with Example 9 with the amounts shown in Table 3 of the amines listed therein instead of with 14.5 g of 3-amine-1-methylaminopropane. The products thus obtained contain as the main component dyestuffs of the general formula

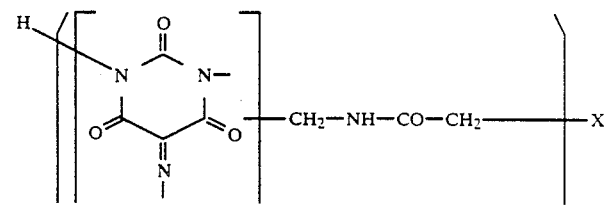

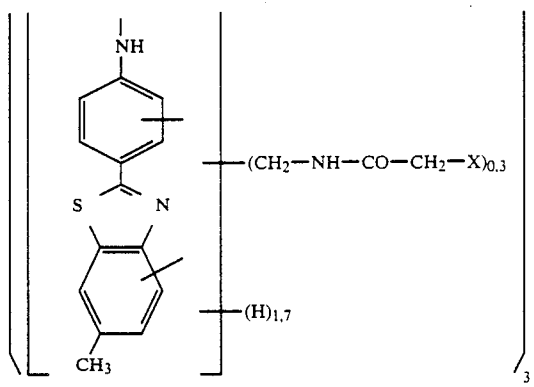

wherein
X stands for a monovalent radical of the amines listed.

Mixtures of the amines mentioned in the examples can also be used. The dyestuffs dye paper a somewhat reddish-tinged yellow.

TABLE 3

| Examples | Amine | g used | g yield |
|---|---|---|---|
| 48 | $H_2N-(CH_2-CH_2-NH)_4-H$ | 28 | 54 |
| 49 | $H_2N-(CH_2-CH_2-NH)_5-H$ | 35 | 55 |
| 50 | $CH_3-NH-(CH_2-CH_2-NH)_2-CH_3$ | 28 | 54 |
| 51 | $(H_2N-(CH_2)_3-NCH_3-CH_2-)_2$ | 31 | 53 |
| 52 | $(H_2N-(CH_2)_3-O-CH_2-)_2$ | 27 | 54 |
| 53 | $(H_2N-(CH_2)_3-NH-CH_2-)_2$ | 27 | 54 |
| 54 | 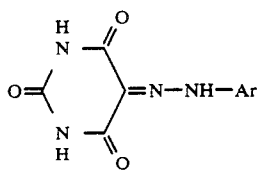 | 20 | 55 |
| 55 | Tripropylentetramin | 28 | 53 |
| 56 | $(H_2N-CH_2-CH_2-CH_2)_2-N-CH_3$ | 23 | 54 |
| 57 | $[(CH_3)_2N-CH_2-CH_2-CH_2]_2-NH$ | 28 | 55 |
| 58 | $H_2N-(CH_2)_3-NH-CH_2-CH_2-NH_2$ | 19 | 52 |

In the following examples, the amounts listed in Table 4 of the chromophoric compounds of the general formula

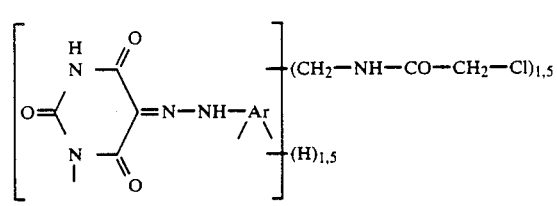

are reacted in accordance with Example 1 with 15 g of paraformaldehyde and 47 g of chloroacetamide. Dyestuff precursors of the general formula $$\left[ \begin{array}{c} H \\ N \\ O= \\ N \\ H \end{array} \begin{array}{c} O \\ \\ =N-NH-Ar \\ \\ O \end{array} \right] \begin{array}{c} -(CH_2-NH-CO-CH_2-Cl)_{1.5} \\ \\ -(H)_{1.5} \end{array}$$

the yields of which are also shown in the table, are

TABLE 4

| Example | Ar | g used | g yield |
|---|---|---|---|
| 59 | benzothiazole-2-yl-phenyl | 96 | 138 |
| 60 | benzoxazole-2-yl-phenyl | 92 | 126 |
| 61 | benzimidazole-2-yl-phenyl | 92 | 128 |
| 62 | methyl-benzimidazole-2-yl-phenyl | 96 | 131 |
| 63 | methyl-benzoxazole-2-yl-phenyl | 96 | 133 |
| 64 | methoxy-phenyl-benzotriazole | 100 | 116 |

EXAMPLE 65

111 g of the product from Example 59 are reacted with 56 g of N-(2-aminoethyl)-piperazine in 3.2 l of water in accordance with Example 8. 113 g of a product with a main component of the formula

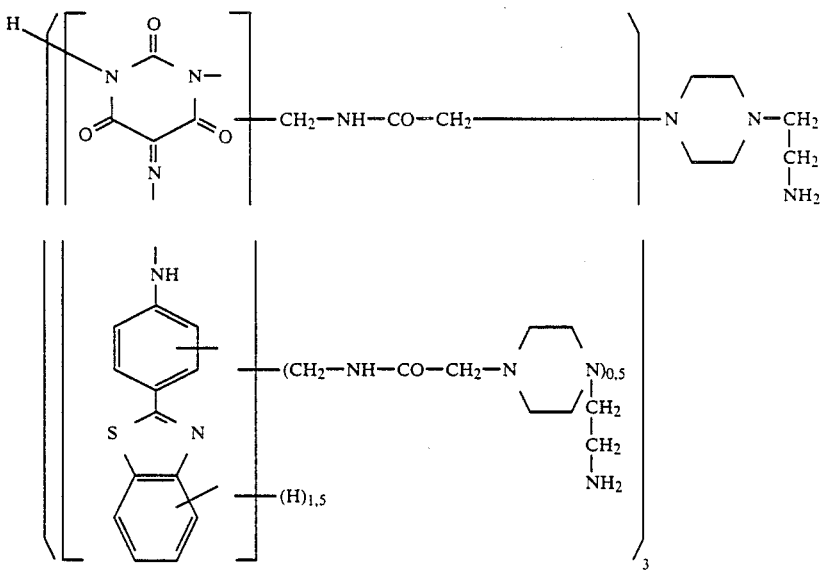

are thus obtained.

The product dyes paper a neutral yellow.

EXAMPLE 66

107 g of the product from Example 60 are reacted with 62 g of $(H_2N-CH_2-CH_2-CH_2)_2N-CH_3$ in 2 l of water in accordance with Example 8. 107 g of a product with a main component of the formula are thus obtained.

The product dyes paper a somewhat greenish-tinged yellow.

EXAMPLE 67

If the procedure is as in the above example but the compound from Example 61 is used as the educt instead of that from Example 60, 109 g of a product with a main component of the formula

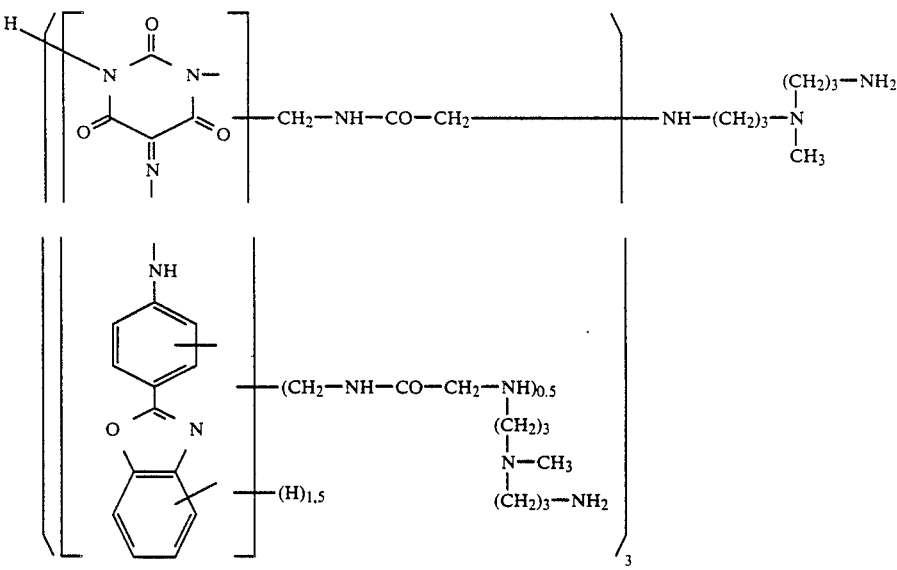

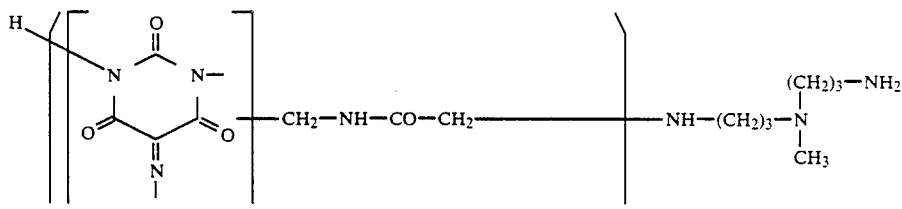

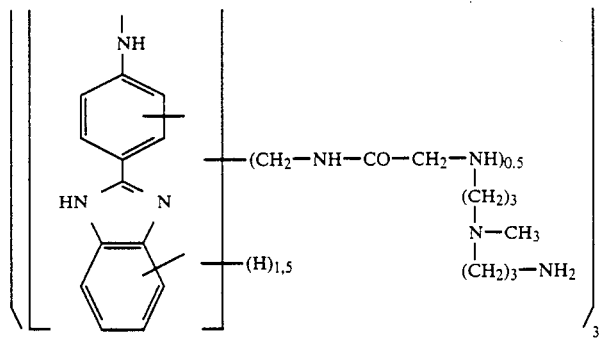

are obtained.
The product dyes paper a neutral yellow.

EXAMPLE 68

110 g of the compound from Example 62 are reacted with 62 g of N-(3-aminopropyl)-morpholine in 2 l of water in accordance with Example 8, whereupon 109 g of a product of the formula which dyes paper a neutral yellow are obtained.

EXAMPLE 69

If the procedures is as in the above example but the compound from Example 63 is used as the educt instead of that from Example 62, 110 of a product of the formula

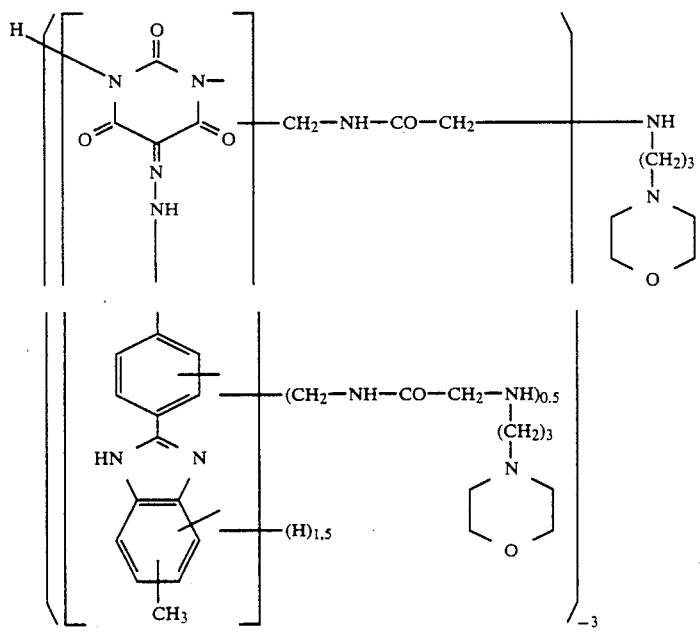

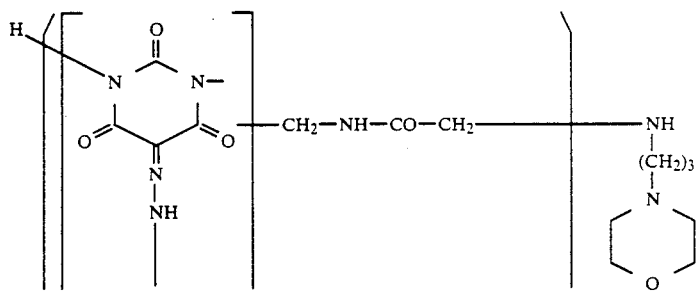

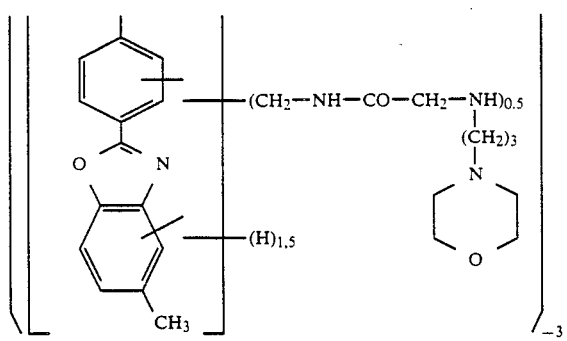

which dyes paper a somewhat greenish-tinged yellow are obtained.

EXAMPLE 70

116 g of the product from Example 64 are introduced into 3 l of water at room temperature and the mixture is heated to 40° C. 58 g of 3-amino-1-diethylaminopropane are added all at once and the pH is kept at 11 by addition of aqueous KOH solution. The temperature is increased to 70° in the course of 6 hours, the pH is then brought to 6 by addition of dilute sulphuric acid and the mixture is filtered with suction. The product is washed neutral and dried to give 112 g of the dyestuff of the following formula, which dyes paper a reddish-tinged yellow.

EXAMPLE 71

A mixture of 12 g of paraformaldehyde and 43 g of 3-chloropropionamide is introduced into 300 ml of monohydrate at room temperature, with cooling. The mixture is then kept at 30° C. for 1 hour and cooled to 0° to 5° C. and 100 g of the compound

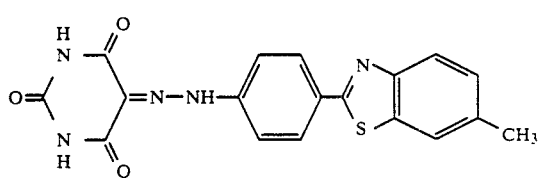

are slowly introduced. If the procedure is otherwise as in Example 1, drying gives 141 g of the compound

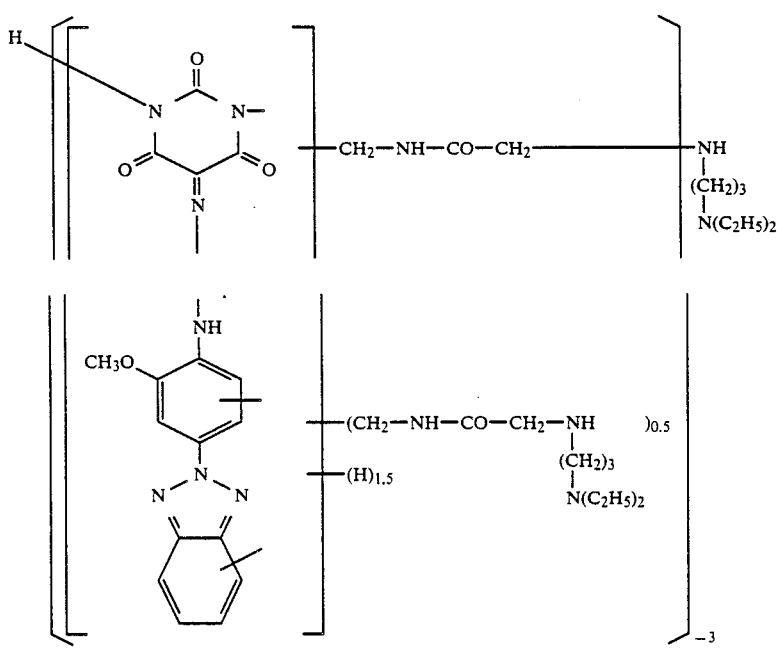

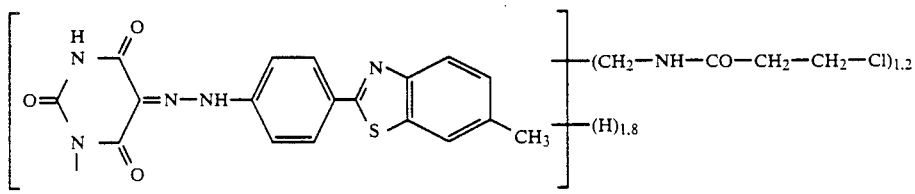

Elemental analysis 80% of chlorine.

The use of the equimolar amount of 3-bromopropionamide leads to the analogous bromine compound.

EXAMPLE 72

55 g of the compound from Example 71 are introduced into 1.5 l of water, 16.5 g of 3-amino-1-dimethylaminopropane are added and the pH is kept at 10.7 by addition of sodium carbonate. The mixture is thereby heated to 60°. When the pH remains constant, after about 5 hours, the pH is slowly brought to 7 with concentrated hydrochloric acid, the mixture is subsequently stirred at 80° C. for 1 hour and the product is filtered off hot with suction. Washing until free from salts and drying at 60° C. gives 52 g of a dyestuff of the formula

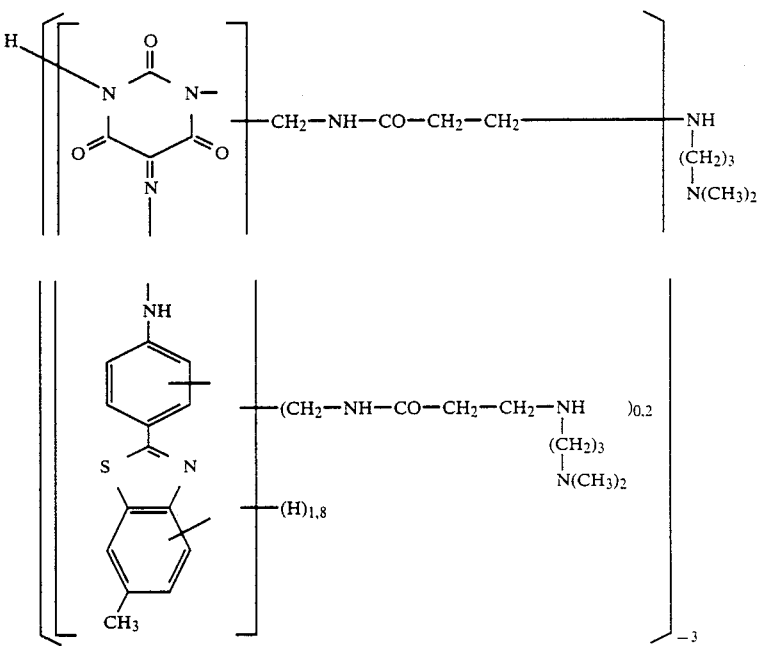

which dyes paper a somewhat reddish-tinged yellow.
$\lambda_{max}$ (20% strength acetic acid) 411 nm.

EXAMPLE 73

If the procedure is as in Example 7 but 93 g of 54% strength aqueous dimethylamine solution are used as the amine, drying gives 91 g of a compound of the formula

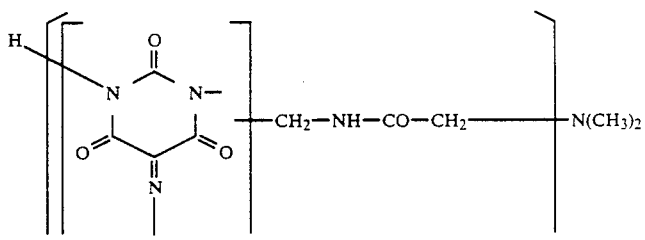

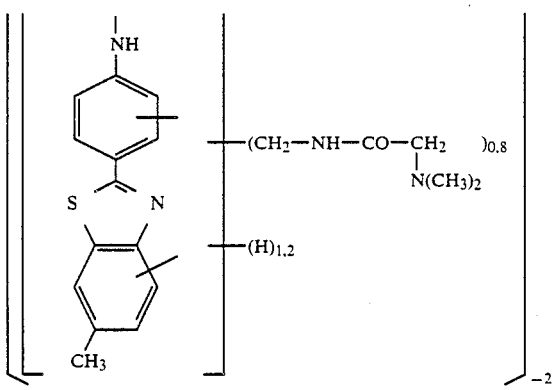

which dyes paper a somewhat reddish-tinged yellow.

EXAMPLE 74

The product from Example 11 is suspended in the form of its moist press-cake, without prior drying, in 1 l of water. 17 ml of dimethyl sulphate are added and the pH is kept at 9 at room temperature by addition of 1 N NaOH solution. After 2 hours, the mixture is heated to 40° C. and is thereby still kept at pH 9. After a further 2 hours, the pH is brought to 65. with dilute hydrochloric acid and the mixture is heated to 80° C. and filtered with suction. Washing until free from salts and drying gives 54 g of a dyestuff of the formula

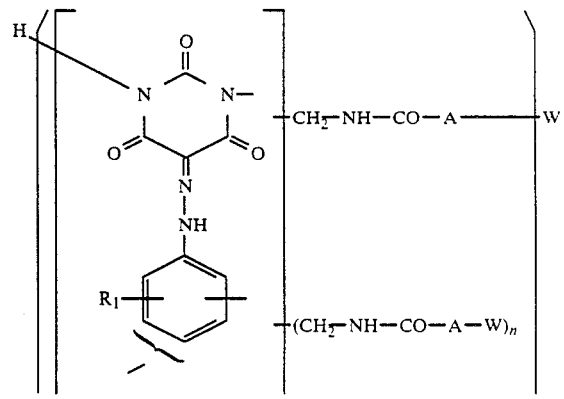

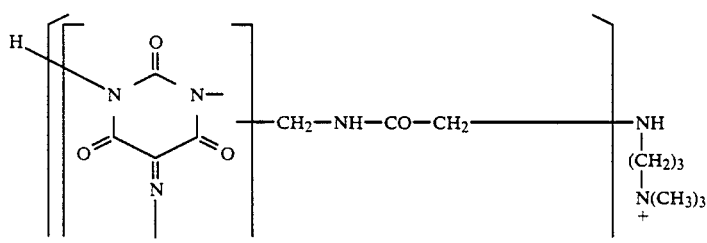

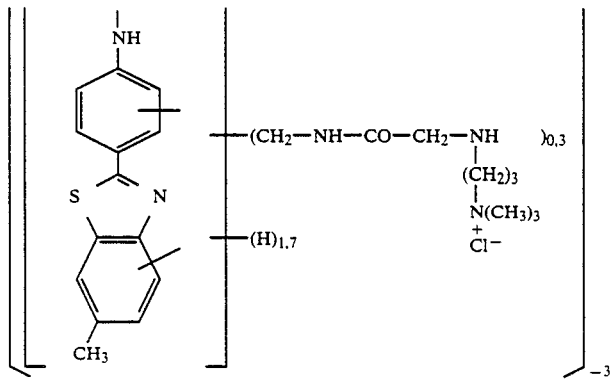

which dyes paper a somewhat reddish-tinged yellow.

We claim:

1. A basic dyestuff of the formula

-continued

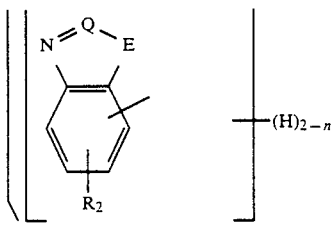

or tautomeric forms thereof,
wherein
R₁ and R₂ stand for hydrogen C₁-C₄-alkyl,
C₁-C₄-alkoxy or halogen,
Q—E stands for C—S, C—O, C—NJ or N⊕-N⁶³,
A stands for C₁-C₄-alkylene,
n stands for 0 to 1.5 and
p stands for 1.3 to 10, and
W stands for 1)

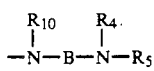

wherein
B is ethylene or trimethylene,
R₄ and R₅ together with the N to which they are attached are

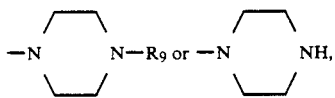

R₉ is methyl, ethyl, CH₂CH₂OH or CH₂CH₂NH₂, and
R₁₀ is H, methyl or ethyl;

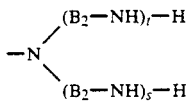

wherein B₂ is ethylene, propylene or trimethylene,
t is 1,2,3,3 or 5 and
s+t is 2,3,4 or 5

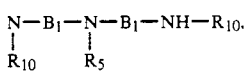

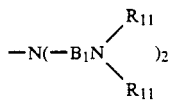

wherein
R₁₁ is methyl or ethyl;
wherein
R₁₁ is methyl or ethyl;

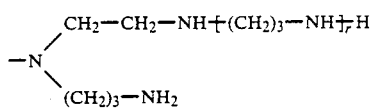

wherein
r is 0 or 1

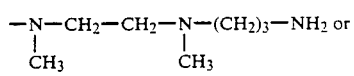

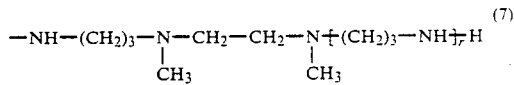

2. A basic dyestuff according to claim 1, of the formula

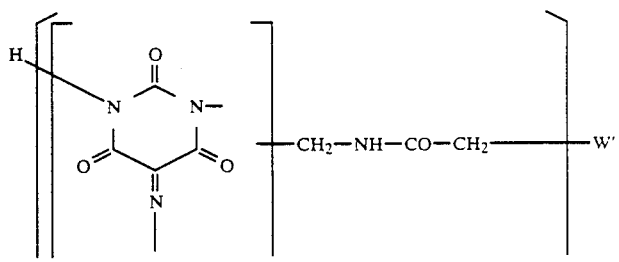

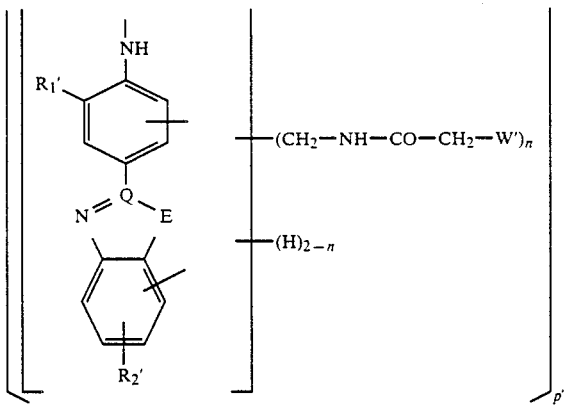

or a tautomeric form thereof,
wherein
  $R_1'$ stands for hydrogen, methoxy, ethoxy or chlorine,
  $R_2'$ stands for hydrogen, methyl, ethyl, methoxy or ethoxy,
  $p'$ stands for 1.5 to 6.

3. A basic dyestuff according to claim 1 of the formula

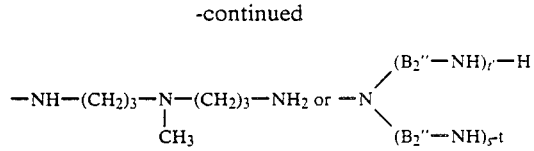

wherein
B$_2''$ is ethylene or propylene,

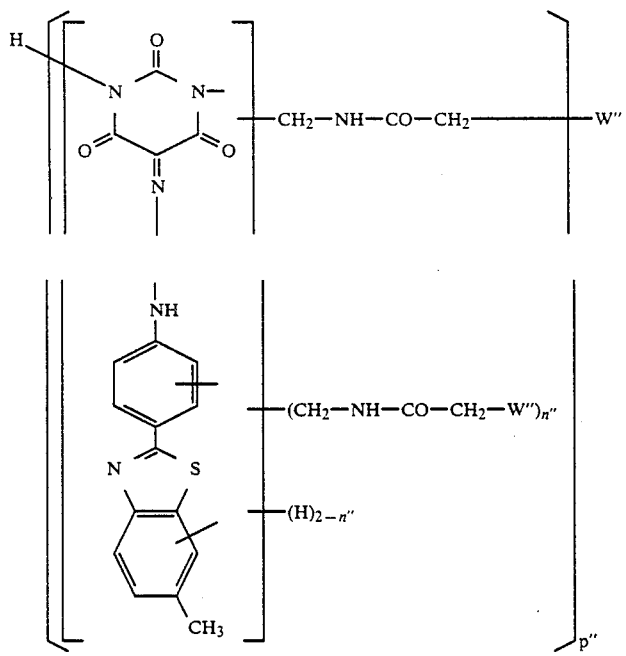

or a tautomeric form thereof,
wherein
  W" stands for the following radicals,

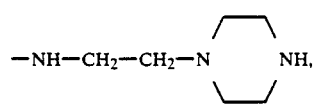

$t'$ is 2, 3 or 4 and
$s+t'$ is 3 or 4 and
$n''$ stands for 0.4 to 0.9 and
$p''$ stands for 2 to 5.

4. A dyestuff according to claim 3, of the formula

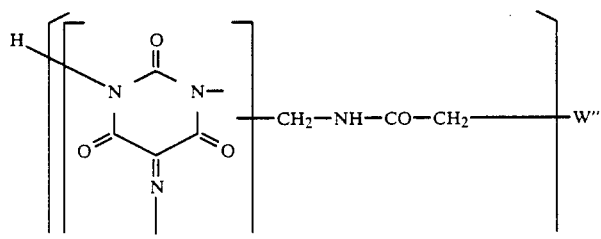
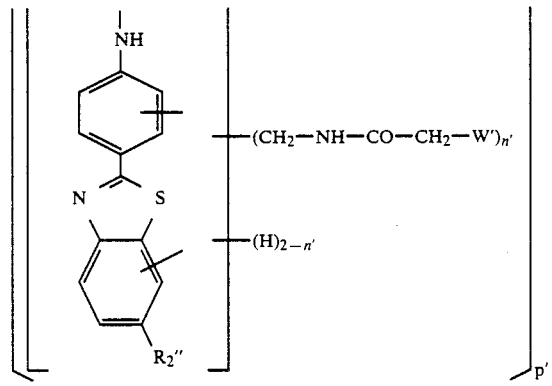
or tautomeric forms thereof,
wherein
$R_2''$ stands for hydrogen or methyl,
$n'$ stands for 0.2 to 1.2.
* * * * *